US007010699B1

(12) United States Patent
Agarwal et al.

(10) Patent No.: US 7,010,699 B1
(45) Date of Patent: Mar. 7, 2006

(54) APPARATUS, METHOD AND SYSTEM FOR PROVIDING A DEFAULT MODE FOR AUTHENTICATION FAILURES IN MOBILE TELECOMMUNICATION NETWORKS

(75) Inventors: Anjana Agarwal, Wheaton, IL (US); Richard Robert Boland, LaGrange, IL (US); John Matthew Gafrick, Naperville, IL (US); Mark Alan McCormick, Naperville, IL (US)

(73) Assignee: Lucent Technologies Inc, Murray Hill, NJ (US)

( * ) Notice: Subject to any disclaimer, the term of this patent is extended or adjusted under 35 U.S.C. 154(b) by 621 days.

(21) Appl. No.: 09/591,759

(22) Filed: Jun. 12, 2000

(51) Int. Cl.
*G06F 1/24* (2006.01)

(52) U.S. Cl. .................. 713/200; 713/201; 713/166; 713/168

(58) Field of Classification Search ............... 713/200, 713/201, 166, 168; 455/410, 411, 435.1; 380/247
See application file for complete search history.

(56) References Cited

U.S. PATENT DOCUMENTS

| 5,506,887 A | 4/1996 | Emery et al. ............... 379/58 |
| 5,721,780 A | 2/1998 | Ensor et al. | |
| 5,890,075 A | 3/1999 | Cyr et al. .................. 455/560 |

FOREIGN PATENT DOCUMENTS

| EP | 0 923 258 A2 | 6/1999 |
| JP | H08-340331 | 12/1996 |
| JP | H11-331412 | 11/1999 |
| WO | WO 99/44387 | 9/1999 |

OTHER PUBLICATIONS

3GPP2-TSG-A: "3GPP2 Access Network Interfaces Interoperability Specification (3G-IOS v4.0.0) Release A (1999) Revision 0"; Jan. 2000; 3GPP2 XP002196745; pp. 37-44 and pp. 234-247.
European Search Report.

*Primary Examiner*—Thomas R. Peeso

(57) ABSTRACT

An apparatus, method and system are disclosed for providing a default mode for authentication failures in a mobile telecommunication network. The system includes an authentication center (typically co-located within a home location register), an adjunct network entity, and an originating mobile switching center. The home location register generally stores information pertaining to a mobile unit, such as a cellular or PCS mobile telephone. The adjunct network entity contains one or more application nodes, such as an announcement application node for providing an announcement on a call leg to the mobile unit. When the network has been accessed by a mobile unit through a call leg, the originating mobile switching center is configured to perform an authentication procedure. The originating mobile switching center further is configured, when the authentication procedure has resulted in an authentication failure, to receive a message from the authentication center to deny the mobile unit access to the network, to terminate a communication session with the mobile unit, and to route the call leg to the announcement application node for the provision of an announcement on the call leg to the mobile unit. Following such an announcement, the originating switching center is also configured to route the call leg to a customer service center, for example, to reprogram the mobile unit.

31 Claims, 4 Drawing Sheets

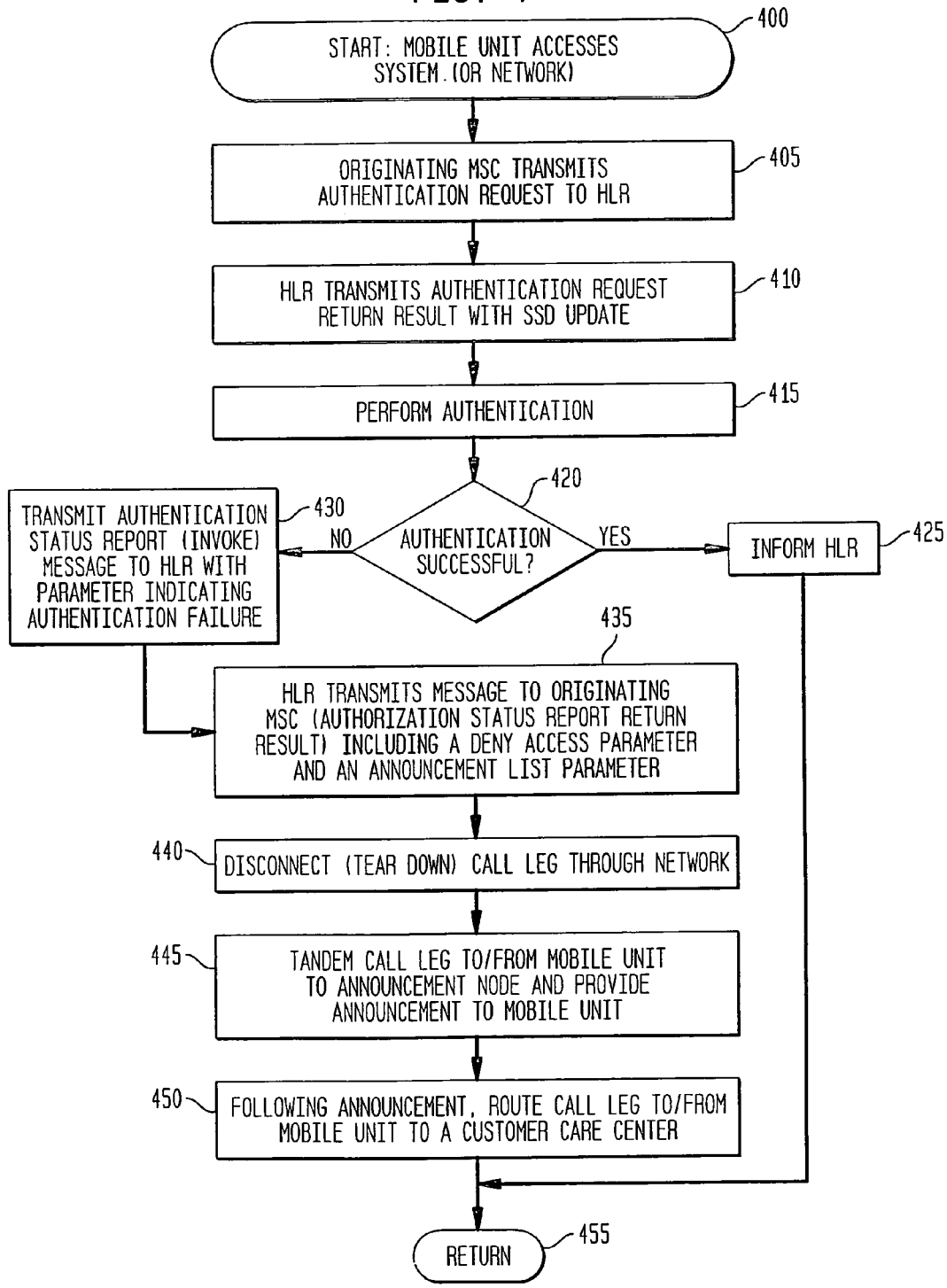

APPARATUS, METHOD AND SYSTEM FOR PROVIDING A DEFAULT MODE FOR AUTHENTICATION FAILURES IN MOBILE TELECOMMUNICATION NETWORKS

FIELD OF THE INVENTION

The present invention relates in general to mobile or wireless telecommunication systems, and more particularly, to an apparatus, method and system for providing a default mode for authentication failures in mobile telecommunication networks.

BACKGROUND OF THE INVENTION

With the advent of increasingly sophisticated mobile telecommunication services having operation across multi-vendor networks and coverage in national and international areas, the tracking of locations of mobile units (such as cellular, PCS or other mobile telephones) and the processing of corresponding services, particularly with roaming or visiting mobile units, has become correspondingly more complex. Within the mobile or wireless telecommunication industry, authentication, as defined in standards such as IS41C, ANSI 41D and IS54B (promulgated by the American National Standards Institute (ANSI), for example), may be used to verify the legitimacy of a mobile unit seeking access to a mobile system, both within a local or home site or within a visited site.

Existing authentication procedures are typically invoked whenever a mobile unit powers up and accesses a mobile network, such as a cellular or other mobile telecommunication system. For authentication procedures, the mobile unit and the telecommunication system typically have been configured in advance with certain information, referred to as authentication information, which is utilized for certain calculations. Both the mobile unit and the telecommunication system perform these calculations, and compare the results. A valid authentication occurs if and when the compared results are the same, and an authentication failure occurs if and when the compared results are different.

To avoid unauthorized or fraudulent use of the telecommunication system, such as the "cloning" of cellular telephones, authentication information, such as shared secret data, is frequently updated. Following such an update, authentication calculations are performed and compared. In the prior art, when the authentication update is successful, such that the compared results are the same, the updated information continues to be used for future authentication procedures. When the authentication update is not successful, such that the compared results are different, then the updated information is typically not used, with future authentication procedures utilizing the previous authentication information.

When there is an authentication failure in the prior art, telecommunication service providers typically take one of two approaches. First, telecommunication service providers often completely deny access and service to the particular mobile unit which had the authentication failure. Under such circumstances, however, the legitimate subscriber or owner of the particular mobile unit may have no idea why service is being denied. If the mobile user is unable to determine the cause of failure and is unable or unwilling to contact their service provider for resolution, the user may seek other communication services or another service provider.

Second, in lieu of a denial of service, other service providers may provide service and allow access to the telecommunication system. In the event an illegitimate or fraudulent user is able to gain such access to the telecommunication system, service providers may suffer a loss of revenue, billing problems, and customer dissatisfaction.

As a consequence, a need remains for an apparatus, method and system to detect certain types of authentication failures, including failures of updates of authentication information, and following such detection, to provide a default mode for the service provider to inform the subscriber of the authentication failure and to remedy the authentication failure. Such a default mode should be operable for both home and roaming mobile units, and also provide for a denial of access to the telecommunication system, to avoid potentially fraudulent use of the telecommunication system. Such a default mode should also route such failures for special treatment, such as for announcements and/or customer care. Such an apparatus, method and system should also be retroactively compatible and operate within the present mobile telecommunication structure and use existing protocols. In addition, such an apparatus, method and system also should be user friendly and user transparent.

SUMMARY OF THE INVENTION

An apparatus, method and system are disclosed for providing a default mode for authentication failures in a mobile telecommunication network. The system includes a home location register, an adjunct network entity, and an originating mobile switching center. The home location register ("HLR") generally stores information pertaining to a mobile unit, such as a cellular or PCS mobile telephone. In the preferred embodiment, the HLR also includes an "authentication center" ("AC"), and is referred to herein as an "HLR/AC". The adjunct network entity contains one or more application nodes, such as an announcement application node for providing an announcement on a call leg to the mobile unit.

The network (or system) is typically accessed by a mobile unit through a call leg, such as by placing an outgoing call through the originating mobile switching center ("MSC"). Either the originating MSC or the HLR/AC may initiate authentication procedures, and the originating MSC and the mobile unit both perform an authentication procedure. When the authentication procedure has resulted in an authentication failure, the originating MSC informs the HLR/AC. The HLR/AC then determines what default modes should be instituted, and transmits a message to the originating MSC to deny the mobile unit access to the network, to terminate a communication session with the mobile unit, and to route the call leg to the announcement application node for the provision of an announcement on the call leg to the mobile unit. Following such an announcement, the originating switching center is also configured to route the call leg to a customer service center, for example, to guide the subscriber through a reprogramming of the mobile unit to avoid future authentication failures.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a flow diagram illustrating a method embodiment for providing a default mode for authentication failures in mobile telecommunication networks in accordance with the present invention.

DETAILED DESCRIPTION OF THE INVENTION

Figure 1:
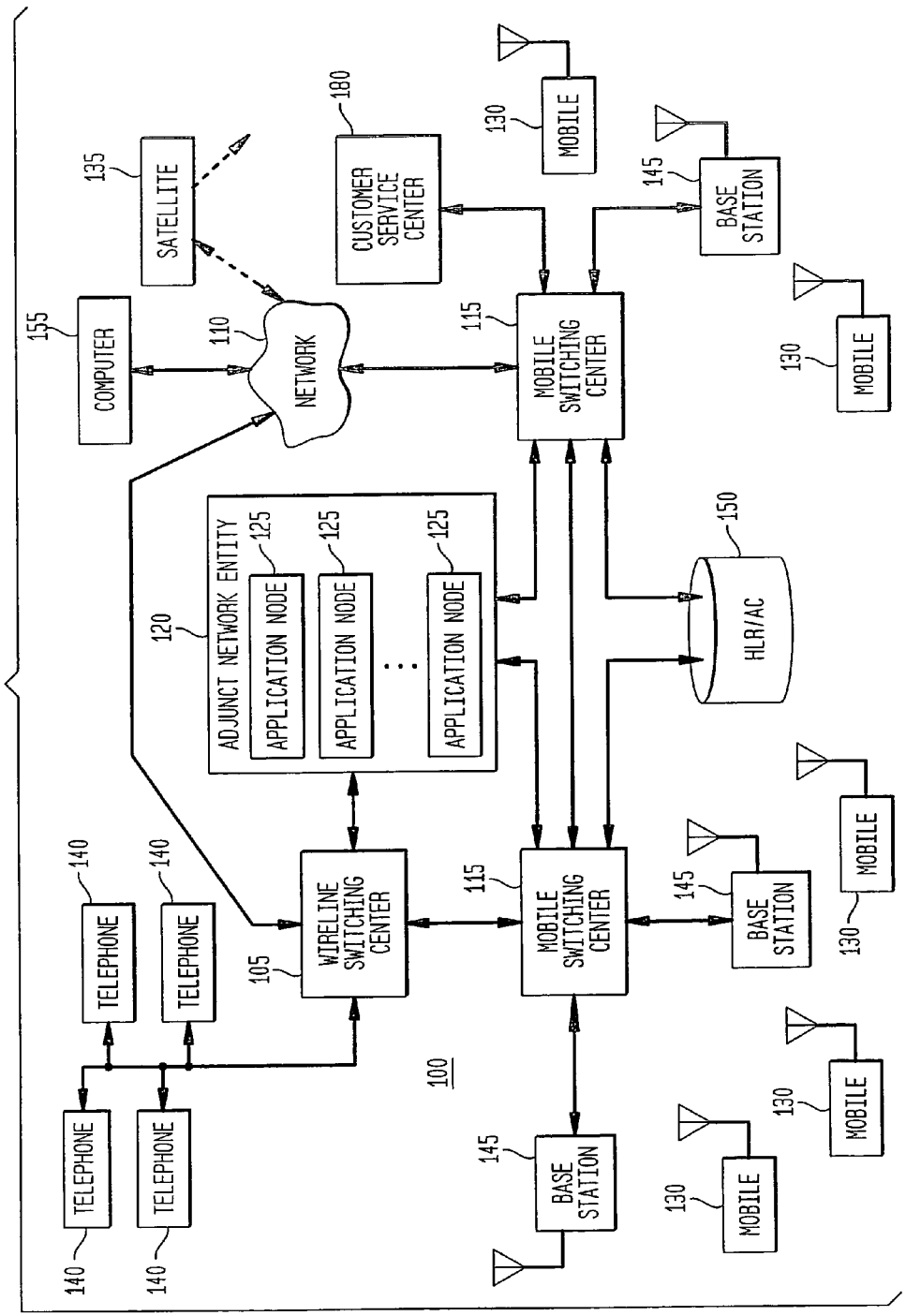
FIG. 1 is a block diagram illustrating a system embodiment for providing a default mode for authentication failures in mobile telecommunication networks in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to detect certain types of authentication failures, and following such detection, to provide a default mode. In accordance with the present invention, such an apparatus, method and system are provided for detecting such authentication failures, including failures of updates of authentication information, and following such detection, for providing a default mode for the service provider to inform the subscriber of the authentication failure and to remedy the authentication failure. Such a default mode is operable for both home and roaming mobile units, and also provides for a denial of access to the telecommunication system, to avoid potentially fraudulent use of the telecommunication system. The default mode provided in accordance with the invention also routes such authentication failures for special treatment, such as for announcements and/or customer care. The apparatus, method and system or the present invention are also retroactively compatible and operate within the present mobile telecommunication structures and use existing protocols. In addition, the apparatus, method and system of the present invention are user friendly and user transparent.

FIG. 1 is a block diagram illustrating a system embodiment for providing a default mode for authentication failures in mobile telecommunication networks in accordance with the present invention. The system (or network) 100 includes one or more mobile switching centers ("MSCs") 115 and one or more wireline switching centers 105 (collectively "switching centers"), which may also be connected via trunk and signaling lines to each other and to a broader network 110, such as to a public switched telephone network ("PSTN"), with multiple telecommunication connections to other locations, such as providing a link to a satellite 135, which may be one or more communications or global positioning system satellites. The system 100 may also have a network (such as internet) connection to one or more computers 155 (or other network communication device).

The system 100 may also includes various databases such as a home location register ("HLR") 150, which stores information pertaining to the various mobile units 130, such as the types of services to be provided to each such mobile unit 130, and for purposes of the present invention, also stores authentication information for each such mobile unit 130, referred to herein as a subscriber profile. When a mobile unit 130 may roam into additional geographic regions, an MSC 115 of that region typically obtains, through various registration and qualification procedures, a copy of the subscriber profile for the particular mobile unit 130, and stores the subscriber profile within the MSC 115, in a visitor location register ("VLR"). In the preferred embodiment, the HLR 150 also includes authentication functionality referred to as an "authentication center" ("AC") and, as a consequence, the HLR is also referred to as an "HLR/AC". In other embodiments, such authentication functionality may be provided within a stand-alone device and is within the scope of the present invention; in such a case, it is understood that HLR/AC includes such a stand-alone AC, without regard to other database functionality which may or may not be within an HLR.

The system 100 may also include one or more intelligent network devices referred to as adjunct network entities 120, such as additional types of databases, a service control point ("SCP"), a service circuit node ("SCN") (also referred to as a service node), an intelligent peripheral ("IP"), or another intelligent network device. One or more adjunct network entities 120 are preferably connected or coupled to a wireline switching center 105 and to a MSC 115. In the preferred embodiment, the adjunct network entities 120 provide a node or platform for particular applications ("application nodes") 125, such as an announcement application (for providing announcements to either the called party or the calling party), a voice mail application, a calling party pays application, a prepaid application, a one number service application, and other intelligent network applications.

The wireline switching center 105 is also generally connected to a plurality of telephones 140 or other customer premise equipment, while the MSCs 115 (via base stations 145 or other wireless transceivers) typically have a wireless link to the various mobile units 130, such as cellular telephones, within a particular geographic region, for voice and data communication. In addition, while the wireline and mobile switching centers 105 and 115 are usually physically separated due to regulatory and other historical reasons, these switching centers may also be combined into one or more switching centers having both wireline and wireless functionalities.

As mentioned above, authentication procedures typically require a calculation, based on authentication information, followed by a comparison of the results produced by the mobile unit 130 and by the HLR/AC 150 or MSC 115. Authentication procedures typically occur on a "global" basis, as each mobile unit 130 powers up or accesses the system 100. In other instances, an MSC 115 will generate a "challenge" to the mobile unit 130, providing the mobile unit 130 with certain current or updated authentication information, directing that the authentication calculations be performed by the mobile unit 130, and followed again by a comparison of the results generated. In either or both of these situations, the authentication information is often "shared secret data" (referred to as SSD), stored both in the mobile unit 130 and the HLR/AC 150 (and/or MSC 115). The SSD itself is typically calculated using known algorithms (such as CAVE), respectively, by the mobile unit 130 and by the HLR/AC 150 (and/or MSC 115), based upon other information, such as the directory number and serial number of the mobile unit 130, an authentication key, and a random number generated by the HLR/AC 150 (or MSC 115) and given to the mobile unit 130. The compared results are typically a checksum generated following these SSD or other authentication calculations.

As part or all of an SSD update, the random number (or the authentication key) is frequently updated, for security purposes. In addition, the random number (or the authentication key) also may become corrupted, for example, by exposure to magnetic fields. As a consequence, authentication failures following an SSD update may occur for a variety of reasons, such as due to illegitimate activities, e.g., a cloned or fraudulent use of a mobile unit 130, or due to legitimate activities, e.g., because of various environmental conditions. In accordance with the present invention, following an authentication failure, a default mode is provided in which, first, access to the system 100 is denied. Second, to accommodate subscribers having authentication failures for legitimate reasons, however, the present invention automatically routes the subscriber to an announcement, typically provided by an application node 125 in an adjunct network entity 120, followed by automatic routing to a customer service center 180, for reprogramming of the mobile unit 130 to eliminate future authentication failures.

As mentioned above, in accordance with the present invention, the system 100 detects authentication failures and, following such detection, provides a default mode. For such detection and default provisioning, different implementations may occur depending upon the geographic location of the mobile unit 130. For example, a particular mobile unit 130 is typically assigned a "home" region, served by a particular MSC 115 referred to as a "home" MSC 115, with a corresponding subscriber profile stored in an HLR/AC 150 connected to the home MSC 115. The HLR/AC 150 may be a stand-alone HLR/AC, as illustrated, or may be incorporated within the home MSC 115 (as an integrated HLR (I-HLR) with AC functionality). As the mobile unit 130 travels, the mobile unit 130 may roam into a non-home or originating geographic region served by an MSC 115 referred to as an originating MSC 115, which may also access the HLR/AC 150, either directly or via the home MSC 115. For example, with the millions of mobile units 130 now in use and with an increase in national and international roaming, the originating MSC 115 may be a short distance or a continent away from the home MSC 115. The authentication failure detection and default provisioning of the present invention may be provided for both home and roaming cases, regardless of geographic separation.

The present invention is described in detail with respect to the roaming case, with corresponding ANSI-compatible messaging of the preferred embodiment. The methodology of the present invention is readily translatable into the home case by those skilled in the art, with ANSI-41 messaging converted into appropriate signaling between the home MSC 115 and HLR/AC 150. In addition, the use of the ANSI-41 and other related standards is understood by those skilled in the art and is considered as a preferred method to transfer of information between MSCs 115 and HLR/ACs 150, and other system 100 elements in the preferred embodiment of the present invention. The implementation of the methodology of the invention within the context of such standards is not a limitation on the scope of the present invention.

Figure 2:
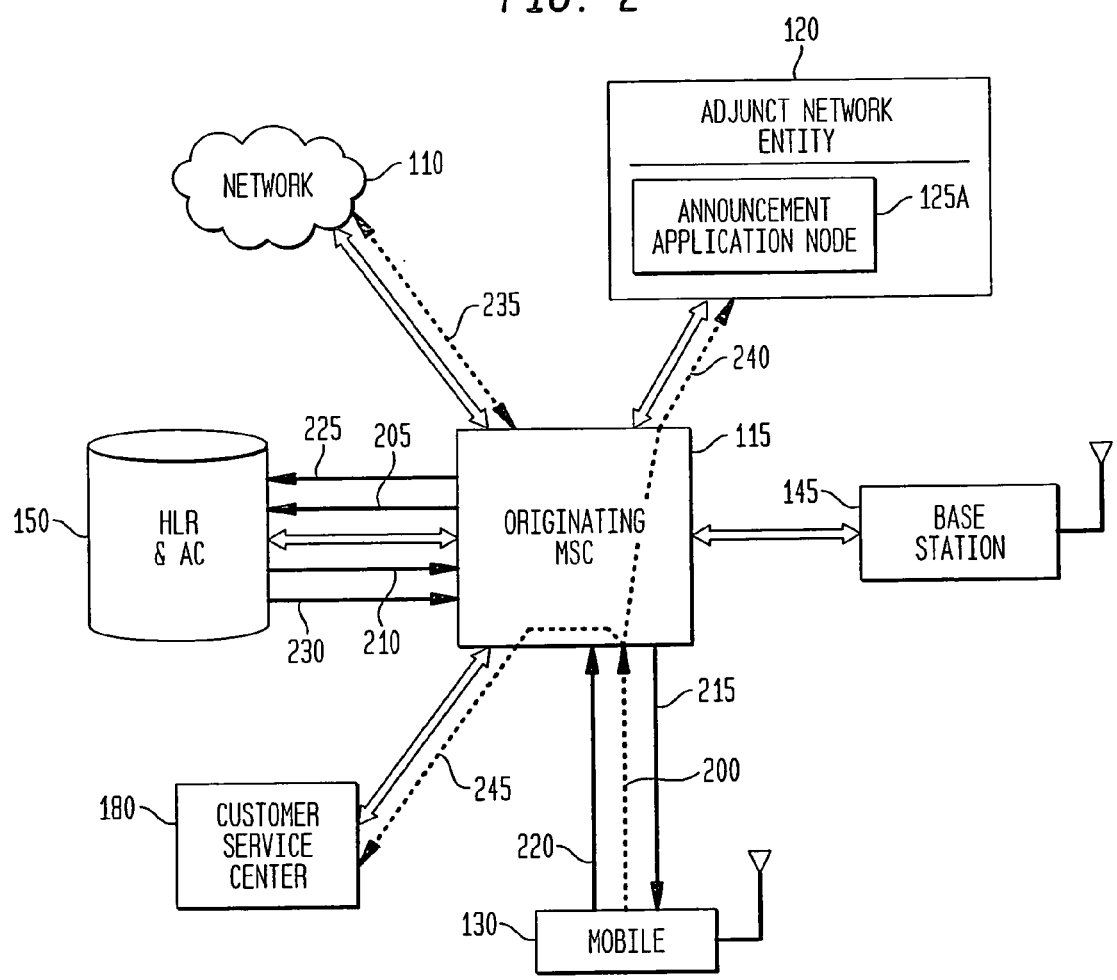
FIG. 2 is a block diagram illustrating a portion of the system embodiment and an information flow for providing a default mode for authentication failures in mobile telecommunication networks in accordance with the present invention.

FIG. 2 is a block diagram illustrating a portion of the system embodiment and an information flow for providing a default mode for authentication failures in mobile telecommunication networks in accordance with the present invention. Referring to FIG. 2, when the mobile unit 130 typically accesses (call leg 200) the system 100, such as by initiating a call to a telephone 140 or another, second mobile unit 130, the originating MSC 115 then sends a message, such as request for authentication, to the HLR/AC 150 (information flow 205). The HLR/AC 150 then transmits a response message to the originating MSC 115, such as an authentication request return result, which includes a new random number for an SSD update (information flow 210). In addition, to initiate authentication procedures, the HLR/AC 150 may also send an authentication directive to the originating MSC 115 (not separately illustrated in FIG. 2), which would also include the new random number for the SSD update. In turn, the originating MSC 115 transmits the new random number for the SSD update to the mobile unit 130 (via base station 145) (information flow 215).

Following receipt of the SSD update, the mobile unit 130 calculates a new SSD, and transmits the result (typically as a checksum) to the originating MSC 115 (also via base station 145) (information flow 220). In the interim, the originating MSC 115, through communication with the HLR/AC 150, has been provided with sufficient data to perform its own calculation of the new SSD, and may compare its result with the result provided by the mobile unit 130. When the results are the same, the authentication is successful or valid, and the originating MSC 115 so informs the HLR/AC 150 (not separately illustrated in FIG. 2), and any calls in progress with the mobile unit 130 are allowed to continue.

When the results of the SSD update are not the same, however, an authentication failure has occurred, and the originating MSC 115 so informs the HLR/AC 150, preferably utilizing an authentication status report (invoke) message, with a parameter indicating the authentication failure (information flow 225). In accordance with the present invention, the HLR/AC 150 transmits a response message (information flow 230) to the originating MSC 115, to implement the default mode of the present invention, namely: directing that the mobile unit 130 be denied access to the system 100 (and tearing down the portion of any current call (call leg 235) into the network 110 or to another switching center 115 or 105); followed by routing (re-trunking) the mobile unit 130 (through the current call leg 200 in progress with the mobile unit 130) to an announcement provided by an announcement application node 125A (information flow 240); and following the announcement, routing (re-trunking) the mobile unit 130 (also through the call leg 200) to a customer service center 180, for a guided reprogramming of the mobile unit 130 by the subscriber (information flow 245). In the preferred embodiment, the response message (information flow 230) from the HLR/AC 150 to the originating MSC 115 is an ANSI-compatible authentication status report return result, with a deny access parameter, and with an announcement list parameter. It should be noted that while an announcement list parameter is used in a variety of ANSI-41 messages, the use of the announcement list parameter in this context and within an authentication status report return result message is one of the novel features of the present invention. The various sub-parameters within the announcement list parameter are utilized to select which announcement(s) are to be played to the subscriber by the announcement application node 125A. For example, typical announcements may be "please hold for customer service" or "a technical problem has occurred; please wait while a service representative is contacted".

A significant feature of the present invention is the retention of control of authentication at the HLR/AC 150, regardless of the location of the mobile unit 150. This allows the HLR/AC 150 to individually determine what default mode treatment is to be provided to the particular mobile unit 130. For example, the HLR/AC 150 may track authentication failures, and a denial of access may be implemented only following several successive authentication failures, rather than immediately following one authentication failure.

In addition, the present invention assists the subscriber, as a user of the mobile unit 130, by immediately re-trunking the failed authentication call to customer service center 180. This allows for immediate correction of any defects or problems that may have caused an authentication failure for a legitimate subscriber. The various embodiments of the present invention simultaneously allow the service provider to avoid the various problems, such as billing problems and lost revenue, typically encountered with potentially fraudulent (cloned) mobile units 130. For example, many service providers prefer not to deny service (and miss the associated revenues) when authentication fails. When there is authentication failure and a mobile unit 130 is a clone or other fraudulent device, the legitimate owner (assigned to the mobile directory number) may not be responsible for the corresponding billing charges and, accordingly, the service provider does not receive payment for the fraudulently procured services. The present invention allows a denial of service in these circumstances, while simultaneously obviating any inconvenience to legitimate subscribers by automatically providing immediate customer service.

Figure 3:
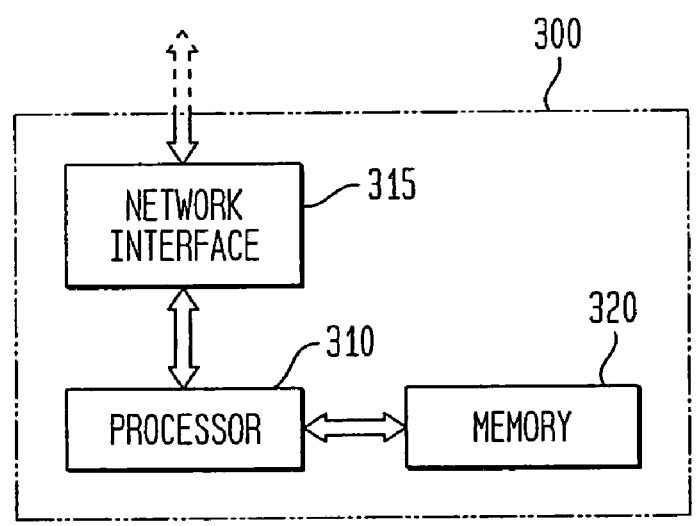
FIG. 3 is a block diagram illustrating an apparatus embodiment for providing a default mode for authentication failures in mobile telecommunication networks in accordance with the present invention.

FIG. 3 is a block diagram illustrating an apparatus embodiment 300 to provide for intelligent tandeming of incoming calls to application nodes in telecommunication systems in accordance with the present invention. Such an apparatus 300 preferably may be included within a switching center 115 or 105, or distributed among a switching center 115 or 105 and an adjunct network entity 120 of a system 100 or 200. The apparatus 300 includes a processor 310, a network interface 315, and a memory 320. The network interface 315 is utilized to receive and transmit data, such as voice information, control messages, shared secret data and other pertinent information, and may be utilized to receive incoming call legs and transmit outgoing call legs (between and among the mobile unit 130, a called/calling party from the network 110, and the application nodes 125 (for announcements, and so on)). The memory 320 may be an integrated circuit (such as various forms of RAM), a magnetic hard drive, an optical storage device, or any other type of data storage apparatus. The memory 320 is used to store information pertaining to program instructions or configurations (discussed below), call management and other call information, such as subscriber profile information. The memory 320 performs such information storage, and may be included within a database (such as database 125E), or within an HLR/AC or VLR, which may be stand-alone (such as HLR/AC 150) or integrated within a switching center 115 or 105, or may be included as other platforms within adjunct network entities 120.

Continuing to refer to FIG. 3, the processor 310 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIGS. 1 and 2, and also discussed in detail below with reference to FIG. 4, with associated memory, such as microprocessor memory or additional RAM, DRAM, SRAM, MRAM, ROM, EPROM or $E^2PROM$. The processor 310 with its associated memory may be configured (via programming or hard-wiring) to perform the methodology of the invention, as discussed above with reference to FIGS. 1–2 and as discussed below with reference to FIG. 4. For example, the methodology may be programmed and stored, in the processor 310 with its associated memory (and/or memory 320) and other equivalent components, as a set of program instructions (or equivalent configuration or other program) for subsequent execution when the processor 310 is operative (i.e., powered on and functioning). Equivalently, when the processor 310 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 310 is implemented in its entirety as a microprocessor, which is programmed to implement the methodology of the invention.

As mentioned above, in addition to incorporation within a switching center 115 (or 105), such an apparatus 300 may be distributed among a switching center 115 or 105 and an adjunct network entity 120. For example, the apparatus 300 may be distributed among an MSC 115 and an adjunct network entity 120, with the memory 320 incorporated within the adjunct network entity 120 (such as an HLR or other database), with the processor 310 having components within either or both the MSC 115 and the adjunct network entity 120, and with the network interface 215 incorporated within the MSC 115. Numerous other variations and equivalent embodiments will be readily apparent are also within the scope of the present invention.

FIG. 4 is a flow diagram illustrating a method embodiment for providing a default mode for authentication failures in mobile telecommunication networks in accordance with the present invention, and provides a useful summary of the present invention. Beginning with the mobile unit 130 accessing the system 100, such as by placing an outgoing call, start step 400, the originating MSC 115 then sends a message to initiate authentication procedures, such as request for authentication, to the HLR/AC 150, step 405. The HLR/AC 150 then transmits a response message to the originating MSC 115, such as an authentication request return result, containing authentication information for the authentication procedure, such as including a new random number for an SSD update, step 410. In lieu of steps 405 and 410, as a single step (not illustrated), the HLR/AC 150 also may initiate authentication procedures, such as by sending an authentication directive to the originating MSC 115, which would also include the authentication information for the authentication procedure (e.g., the new random number for the SSD update).

Next, step 415, the originating MSC 115 transmits the new random number for the SSD update to the mobile unit 130 (via base station 145), and the mobile unit 130 and the originating MSC 115 perform the authentication procedures discussed above, such as calculating a new SSD and comparing a checksum of the results. When the results are the same, the authentication is successful or valid, step 420, and the originating MSC 115 so informs the HLR/AC 150, step 425, with any calls in progress with the mobile unit 130 allowed to continue without any further steps or measures required (i.e., by default), and the method may end, return step 455.

When the results of the SSD update are not the same, however, an authentication failure has occurred, step 420, and the originating MSC 115 so informs the HLR/AC 150, preferably utilizing an authentication status report (invoke) message, with a parameter indicating the authentication failure, step 430. In accordance with the present invention, the HLR/AC 150 transmits a response message to the originating MSC 115, step 435, to implement the default mode of the present invention. As mentioned above, the response message is preferably an authentication status report return result, having a deny access parameter, and including an announcement list parameter. In the preferred embodiment, the default mode may include directing that the mobile unit 130 be denied access to the system 100 (and tearing down the call leg into the network 110 or to another switching center 115 or 105), step 440; followed by routing (re-trunking) the mobile unit 130 (through the current call leg in progress between the originating MSC 115 and the mobile unit 130) to an announcement provided by an announcement application node 125A, step 445; and following the announcement, routing (re-trunking) the mobile unit 130 (also through the call leg between the originating MSC 115 and the mobile unit 130) to a customer service center 180, step 450, for a reprogramming of the mobile unit 130. Following steps 450 or 425, the method may end, return step 455.

As may be apparent from the above discussion, the system, apparatus and method of the present invention provide significant advantages. The various embodiments of the present invention provide for detecting authentication failures, including failures of updates of authentication information, and following such detection, provide a default mode for the service provider to inform the subscriber of the authentication failure and to remedy the authentication failure. Such a default mode is operable for both home and roaming mobile units, and also provides for a denial of access to the telecommunication system, to avoid potentially fraudulent use of the telecommunication system. The default mode provided in accordance with the invention also routes such authentication failures for special treatment, such as for announcements and/or customer service. Control of the mobile unit is also retained by the home HLR/AC. The apparatus, method and system or the present invention are also retroactively compatible and operate within the present mobile telecommunication structures and use existing protocols. In addition, the apparatus, method and system of the present invention are user friendly and user transparent.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for providing a default mode for authentication failures in a mobile telecommunication network, the network having been accessed by a mobile unit through a call leg, the method comprising:

(a) performing an authentication procedure;
(b) when the authentication procedure has resulted in an authentication failure, denying the mobile unit access to the network and terminating a communication session with the mobile unit by tearing down a second call leg from a network switch to a third party; and
(c) providing an announcement on the call leg to the mobile unit.

2. The method of claim 1, further comprising:
routing the call leg to a customer service center.

3. The method of claim 2, further comprising:
reprogramming the mobile unit with correct data for the authentication procedure.

4. The method of claim 1, wherein step (a) further comprises:
transmitting a message requesting the authentication procedure; and
receiving a response message containing authentication information.

5. The method of claim 4, wherein the authentication information is a random number.

6. The method of claim 1, wherein step (a) further comprises:
calculating a first shared secret data by the mobile unit;
calculating a second shared secret data by a switching center; and
comparing the first shared secret data and the second shared secret data to determine the authentication failure.

7. The method of claim 1, wherein step (b) further comprises:
transmitting an authentication status report return result, the authentication status report return result including a deny access parameter and an announcement list parameter.

8. The method of claim 1, wherein step (a) further comprises:
transmitting an authorization directive message directing the authentication procedure, the authorization directive message containing authentication information.

9. An apparatus for providing a default mode for authentication failures in a mobile telecommunication network, the network having been accessed by a mobile unit through a call leg, the apparatus comprising:
a network interface for transmitting and receiving a plurality of call legs;
a memory; and
a processor coupled to the network interface and to the memory, wherein the processor, when operative, is configured to perform an authentication procedure; the processor further configured, when the authentication procedure has resulted in an authentication failure, to denying the mobile unit access to the network, to terminate a communication session with the mobile unit; and to provide for an announcement on the call leg to the mobile unit.

10. The apparatus of claim 9, wherein the processor is further configured to route the call leg to a customer service center.

11. The apparatus of claim 9, wherein the processor is further configured to, via the network interface, transmit a message requesting the authentication procedure, and receive a response message containing authentication information.

12. The apparatus of claim 11, wherein the authentication information is a random number.

13. The apparatus of claim 9, wherein the processor is further configured to receive, via the network interface, a first shared secret data calculated by the mobile unit; and wherein the processor is further configured to calculate a second shared secret data and to compare the first shared secret data and the second shared secret data to determine the authentication failure.

14. The apparatus of claim 9, wherein the processor is further configured to receive, through the network interface, an authentication status report return result, the authentication status report return result including a deny access parameter and an announcement list parameter.

15. The apparatus of claim 9, wherein the processor is further configured to tear down a second call leg to a third party.

16. The apparatus of claim 9, wherein the processor is further configured to receive, through the network interface, an authorization directive message directing the authentication procedure, the authorization directive message containing authentication information.

17. A system for providing a default mode for authentication failures in a mobile telecommunication network, the network having been accessed by a mobile unit through a call leg, the system comprising:
   an authentication center; and
   an originating mobile switching center couplable to the authentication center, wherein the originating mobile switching center, when operative, is configured to perform an authentication procedure; the originating mobile switching center further configured, when the authentication procedure has resulted in an authentication failure, to receive a message from the authentication center to deny the mobile unit access to the network, to terminate a communication session with the mobile unit, and to provide for an announcement on the call leg to the mobile unit.

18. The system of claim 17, further comprising:
   an adjunct network entity couplable to the originating switching center, the adjunct network entity having an announcement application node; and
   wherein the originating mobile switching center is further configured to route the call leg to the announcement application node.

19. The system of claim 17, wherein the originating mobile switching center is further configured to route the call leg to a customer service center.

20. The system of claim 17, wherein the originating mobile switching center is further configured to transmit to the authentication center a message requesting the authentication procedure, and receive from the authentication center a response message containing authentication information.

21. The system of claim 20, wherein the authentication information is a random number.

22. The system of claim 17, wherein the originating mobile switching center is further configured to receive a first shared secret data calculated by the mobile unit; and wherein the originating mobile switching center is further configured to calculate a second shared secret data and to compare the first shared secret data and the second shared secret data to determine the authentication failure.

23. The system of claim 17, wherein the originating mobile switching center is further configured to receive, from the authentication center, an authentication status report return result, the authentication status report return result including a deny access parameter and an announcement list parameter.

24. The system of claim 17, wherein the originating mobile switching center is further configured to tear down a second call leg to a third party.

25. The system of claim 17, wherein the originating mobile switching center is further configured to receive, from the authentication center, an authorization directive message directing the authentication procedure, the authorization directive message containing authentication information.

26. The system of claim 17, wherein the authentication center is co-located with a home location register.

27. A system for providing a default mode for authentication failures in a mobile telecommunication network, the network having been accessed by a mobile unit through a call leg, the system comprising:
   an adjunct network entity, the adjunct network entity having an announcement application node;
   a home location register having an authentication center; and
   an originating mobile switching center couplable to the authentication center, wherein the originating mobile switching center, when operative, is configured to perform an authentication procedure by calculating a first shared secret data result and comparing the first shared secret data result with a second shared secret data result received from the mobile unit; the originating mobile switching center further configured to determine an authentication failure when the first shared secret data result is not identical to the second shared secret data result; the originating mobile switching center further configured, when the authentication procedure has resulted in the authentication failure, to transmit an authentication status report message to the authentication center indicating the authentication failure, and to receive an authentication status report return result message from the authentication center, the authentication status report return result message including a deny access parameter and an announcement list parameter; the originating mobile switching center further configured to deny the mobile unit access to the network and to terminate a communication session with the mobile unit by tearing down a second call leg to a third party; and wherein the originating mobile switching center is further configured to route the call leg to the announcement application node to provide for an announcement on the call leg to the mobile unit, and subsequent to the provision of the announcement, to route the call leg to a customer service center.

28. A system for providing a default mode for authentication failures in a mobile communication network, the network having been accessed by a mobile unit through a call leg, the system comprising:
   means for performing an authentication procedure;
   means, when the authentication procedure has resulted in an authentication failure, for denying the mobile unit access to the network and terminating a communication session with the mobile unit by tearing down a second call leg from a network switch to a third party;
   means for providing an announcement on the call leg to the mobile unit; and
   means for routing the call leg to a customer service center.

29. The system of claim 28, further comprising:
   means for transmitting a message requesting the authentication procedure; and means for transmitting a response message containing authentication information.

30. The system of claim 28, further comprising:

means for transmitting an authentication status report return result, the authentication status report return result including a deny access parameter and an announcement list parameter.

31. The system of claim 28, further comprising:

means for transmitting an authorization directive message directing the authentication procedure, the authorization directive message containing authentication information.

\* \* \* \* \*